US012564175B2

(12) United States Patent (10) Patent No.: US 12,564,175 B2
Schwenker et al. (45) Date of Patent: Mar. 3, 2026

(54) DRIVING ROBOT FOR AGRICULTURAL TASKS

(71) Applicant: GEA FARM TECHNOLOGIES GMBH, Bönen (DE)

(72) Inventors: Alexander Schwenker, Schwerte (DE); Tobias Haupt, Unna (DE)

(73) Assignee: GEA Farm Technologies GmbH, Bönen (DE)

( * ) Notice: Subject to any disclaimer, the term of this patent is extended or adjusted under 35 U.S.C. 154(b) by 34 days.

(21) Appl. No.: 18/713,231

(22) PCT Filed: Nov. 15, 2022

(86) PCT No.: PCT/EP2022/082043
§ 371 (c)(1),
(2) Date: May 24, 2024

(87) PCT Pub. No.: WO2023/094226
PCT Pub. Date: Jun. 1, 2023

(65) Prior Publication Data
US 2025/0017171 A1 Jan. 16, 2025

(30) Foreign Application Priority Data
Nov. 26, 2021 (DE) ..................... 10 2021 131 077.6

(51) Int. Cl.
*A01K 5/02* (2006.01)
*A01K 1/01* (2006.01)
(52) U.S. Cl.
CPC .............. *A01K 5/02* (2013.01); *A01K 1/0128* (2013.01)

(58) Field of Classification Search
CPC ................................ A01K 5/02; A01K 1/0128
See application file for complete search history.

(56) References Cited

U.S. PATENT DOCUMENTS

| | | | |
|---|---|---|---|
| 7,640,889 B2* | 1/2010 | Van Den Berg | ........ A01J 5/003 119/51.02 |
| 11,259,498 B2* | 3/2022 | Xu | ........ B25J 11/0085 |
| 11,691,684 B2* | 7/2023 | Liet | ........ B62D 63/08 414/21 |

(Continued)

FOREIGN PATENT DOCUMENTS

| | | | |
|---|---|---|---|
| DE | 202018105801 U1 | 1/2020 | |
| DE | 202020005554 U1 * | 2/2022 | ........... A01K 5/0266 |
| EP | 2007191 B1 | 9/2009 | |

(Continued)

OTHER PUBLICATIONS

International Search Report and Written Opinion mailed Mar. 15, 2023 in related/corresponding International Application No. PCT/EP2022/082043.

(Continued)

*Primary Examiner* — Monica L Perry
*Assistant Examiner* — Aaron M Rodziwicz
(74) *Attorney, Agent, or Firm* — PATENT PORTFOLIO BUILDERS PLLC

(57) ABSTRACT

A driving robot for agricultural tasks includes a chassis and a functional unit mounted on the chassis. The chassis provides supports carrying the functional unit. A force sensor is provided for at least one of the supports, which detects a force exerted by the functional unit on the chassis.

17 Claims, 15 Drawing Sheets

(56) References Cited

U.S. PATENT DOCUMENTS

Figure 1A:
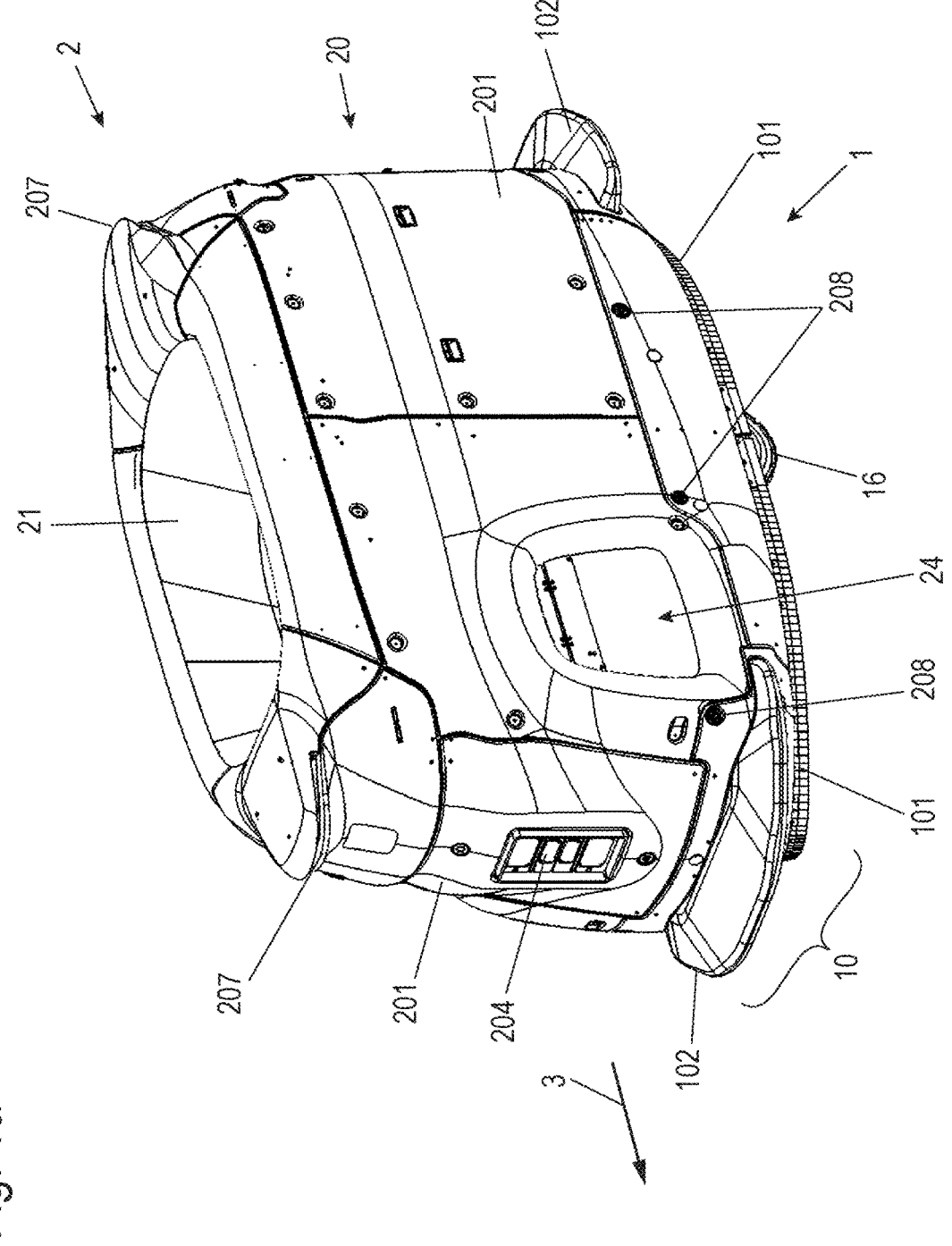

| | | | | |
|---|---|---|---|---|
| 2015/0250137 A1 * | 9/2015 | Palsgaard | ........... | A01K 5/0266 |
| | | | | 119/57.92 |
| 2025/0242497 A1 * | 7/2025 | Cristache | .............. | B25J 9/1617 |

FOREIGN PATENT DOCUMENTS

| | | | | | | |
|---|---|---|---|---|---|---|
| EP | | 3488690 | A1 * | 5/2019 | ........... | A01K 1/0128 |
| EP | | 4103519 | B1 * | 5/2024 | ................ | C02F 1/68 |
| FR | | 2862489 | A1 * | 5/2005 | ............. | A01K 1/105 |
| WO | WO-2008097080 | A1 * | 8/2008 | ......... | B01F 35/7548 |
| WO | | 2016023716 | A1 | 2/2016 | | |
| WO | WO-2018234374 | A1 * | 12/2018 | ........... | A01K 1/0128 |

OTHER PUBLICATIONS

Search Report created Sep. 23, 2022 in related/corresponding DE Application No. 10 2021 131 077.6.

* cited by examiner

DRIVING ROBOT FOR AGRICULTURAL TASKS

BACKGROUND AND SUMMARY OF THE INVENTION

Exemplary embodiments of the invention relate to a driving robot for agricultural tasks, in particular in a stable or yard area.

Many tasks in a stable or yard area of an agricultural operation are associated with the transportation of materials. For example, feeding systems are often used to feed animals, in which feed rations made from various basic ingredients are mixed in a central area, the so-called "kitchen", in line with requirements and in a timely manner and distributed along so-called "feed alleys" to feed the animals. Another example concerns the removal of animal excrement. The cleaning of yard or stable areas is also usually carried out using vehicles due to the size of the areas.

In order to be able to carry out these tasks as autonomously as possible and with as little manpower as possible, automated systems and devices have become established for these different applications in the agricultural sector.

For example, an autonomous feeding system for animals, such as cows, is known from publication WO 2008/097080 A1. A central component of this system is an autonomously driving vehicle having a mixing container that can be filled automatically in a central so-called "kitchen area". The vehicle's container is mounted on the vehicle so that it can be rotated and tilted. A rotary movement of the container, in conjunction with a spiral-shaped structure formed on the container walls, ensures that the feed is mixed during the journey from the feed containers to the unloading point for the feed. Feed is automatically dispensed at this point by tipping the container. Batteries are installed on the vehicle to supply power for both the vehicle's driving mode and for mixing and dispensing the feed. With regard to the movement of the vehicle, various options are described, for example that the path is predetermined via previously laid rails. Another alternative described is autonomous navigation using sensors or route markings. Navigation based on a radio positioning system, such as the GPS (Global Positioning System), is also described.

It is also stated that the autonomously driving vehicle has an integrated weighing system in order to record the amount of feed picked up or dispensed.

An autonomously driving robot is known from publication WO 2016/023716 A1, which searches an area in which animals can move freely in the yard for excrement, collects it and unloads it at a collection point.

The publication EP 2 007 191 A1 discloses an autonomously moving robot used to push together feed that has already been unloaded in a feed alley at regular intervals and thus push it back into the area where the animals can reach the feed to eat.

The above examples show different tasks that are performed by autonomous vehicles in the barn and yard area of a farm. In the known cases, specially equipped autonomous vehicles are used for the different applications, which is not only costly and material-intensive, but also requires a high level of maintenance and training for the autonomous vehicles if several different autonomous vehicles are used in the same stable and yard area.

Exemplary embodiments of the present invention are directed to an autonomous vehicle that can be used as universally as possible to carry out tasks in the barn and yard area of an agricultural operation.

A driving robot for agricultural tasks of the type mentioned at the beginning and according to the invention has a chassis and an interchangeable functional unit arranged thereon. The chassis provides supports that carry the functional unit, wherein a force sensor is provided for at least one of the supports, which detects a force exerted on the chassis by the functional unit.

The driving robot can be used universally thanks to the interchangeable functional unit. Costs and storage space are saved for both the manufacturer and the user, as a single chassis can be used with different functional units that provide different functionality. This is possible because not all of the available functional units usually have to be used autonomously at the same time.

The force sensors can then be used to statically measure the weight force exerted by the functional unit on the chassis. In this way, the process of putting on or taking off the functional unit can be monitored by the driving robot itself. A change in the weight of the functional unit, e.g., when loading or unloading transported goods, can also be detected.

The force sensors can also be used to determine dynamically changing forces or force ratios during driving operation. These can provide information, for example, about inclinations of the driving robot in the longitudinal and transverse directions and also about uneven floors. Furthermore, accelerations can be recorded, which can be used to support odometric data for the navigation of the driving robot.

In an advantageous embodiment, the driving robot is designed as a feeding robot in that the functional unit has at least one container for holding food. Preferably, the container is designed as a mixing container and has a mixing device. The container is also preferably coupled to a feed conveyor in order to discharge feed from the container. The feed conveyor can comprise a conveyor belt, which is preferably aligned transversely to the direction of travel of the feeding robot and can discharge feed to both sides of the robot.

The feeding robot can pick up feed component by component from silos or similar stores, mix it and transport it autonomously to one or more feeding stations and dispense it there. If the empty weight of the functional unit is known, the mass of feed in the container can be determined at any time using the force sensors. Changes in the measured values provide information about the quantities of feed picked up and/or dispensed.

In alternative embodiments, the driving robot can be designed as a cleaning robot, as a bedding robot for straw or similar, or as a universal transport robot by means of a corresponding functional unit.

In a further advantageous embodiment, the driving robot has at least three supports, each of which is assigned a force sensor. Another advantage is that the force exerted by the functional unit on the chassis is essentially applied entirely via the supports, which ensures that the force sensors detect the force correctly. The supports can have bearing plates on which the functional unit rests.

A connection between the supports and the functional unit can preferably be controlled, closed and/or released using actuators. This makes it possible for a driving robot to switch independently and automatically between different functional units as required in a changing station or zone.

In addition to the supports, there can be at least one swivel bearing between the chassis and the functional unit, which can be used as required to tilt the functional unit on the chassis when the connection to the supports is released. This can be done manually or by a drive on the driving robot. For service purposes in particular, it can be advantageous for the functional unit not to be completely removed, but to be tilted to the side at the pivot bearings in order to gain access to otherwise concealed components of the functional unit and/ or other parts of the body and/or chassis.

In a further advantageous embodiment, the chassis of the driving robot has a semi-trailer chassis and a towing chassis, with the semi-trailer chassis resting on the towing chassis in a pivot bearing. Preferably, the semi-trailer chassis has a swivel wheel and the towing chassis has at least two drive wheels and a further swivel wheel.

The three wheels of the towing chassis represent three points of contact between the towing chassis and the ground. Since a plane is geometrically determined by three points, but not overdetermined, it is ensured that the three wheels are in contact with the ground at all times. This ensures a safe drive and good support even on uneven ground on a farm.

The pivot bearing between the towing chassis and the semi-trailer chassis allows them to pivot in relation to each other around an axis of the pivot bearing. The axis of the pivot bearing is preferably aligned horizontally and transversely to the direction of travel. In this way, any unevenness of the ground in the longitudinal direction can be compensated for in the best possible way by the combination of towing chassis and semi-trailer chassis, whereby safe ground contact of all wheels is guaranteed.

BRIEF DESCRIPTION OF THE DRAWING FIGURES

Figure 3:
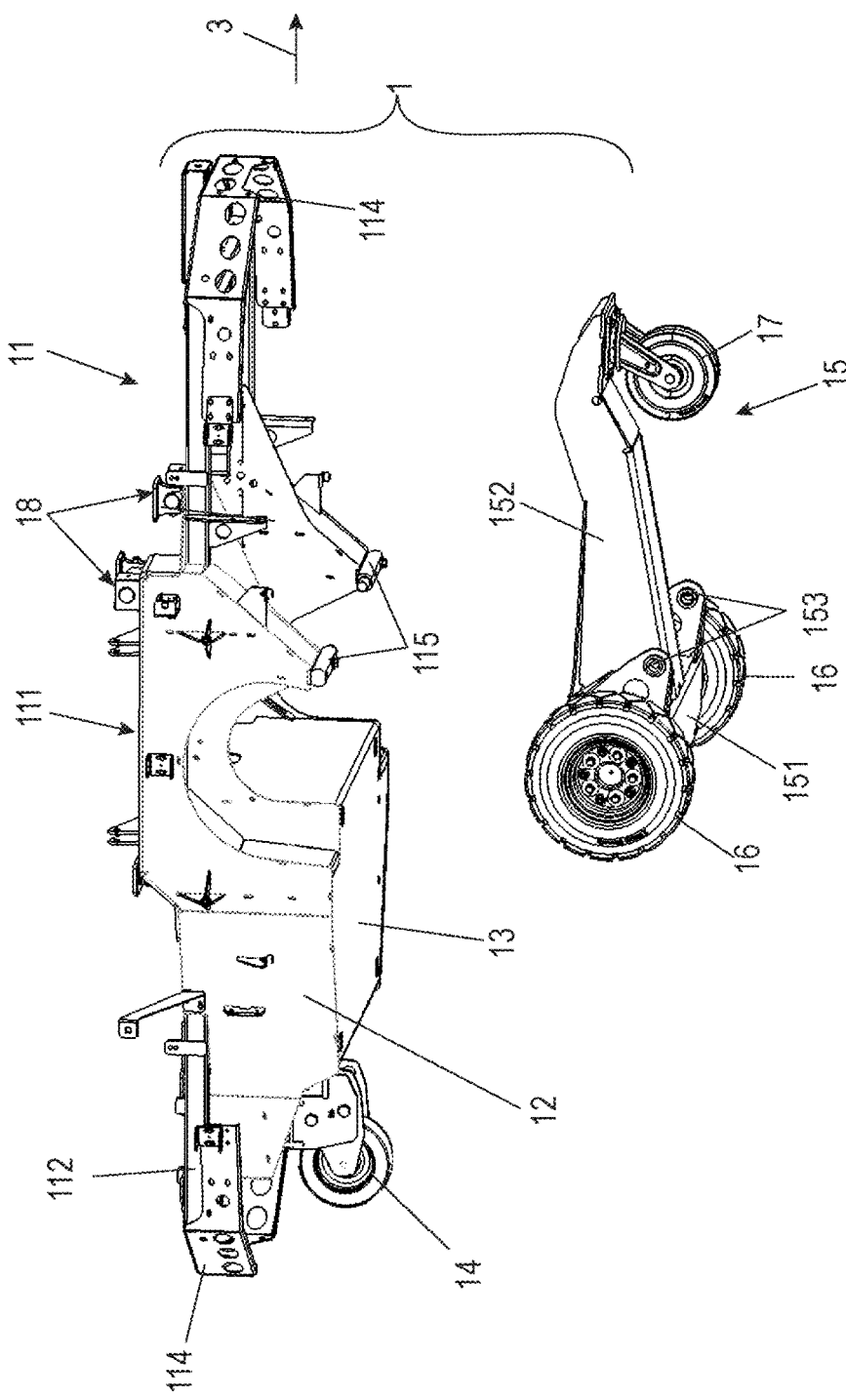
Figure 4:
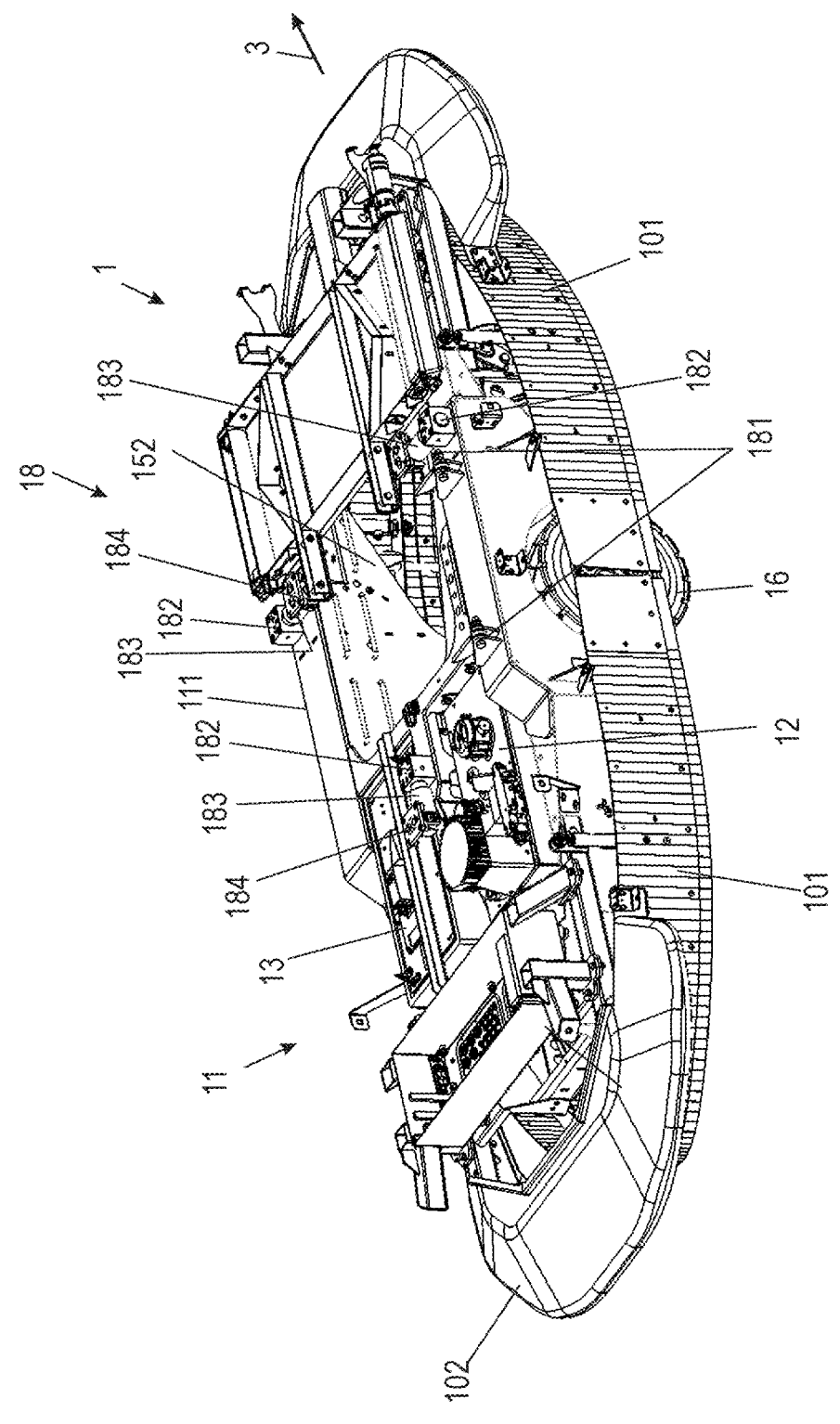
Figure 5A:
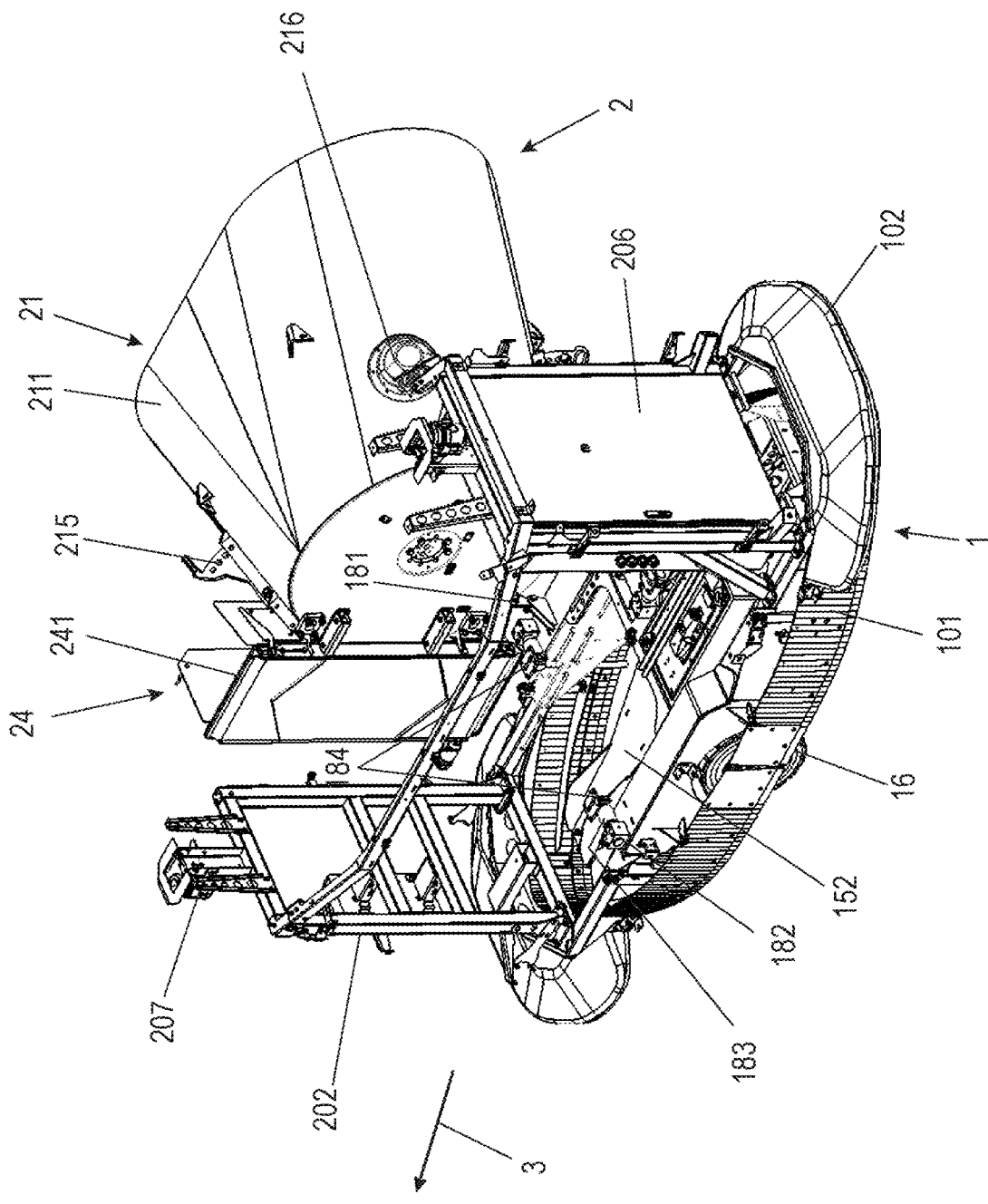
Figure 5B:
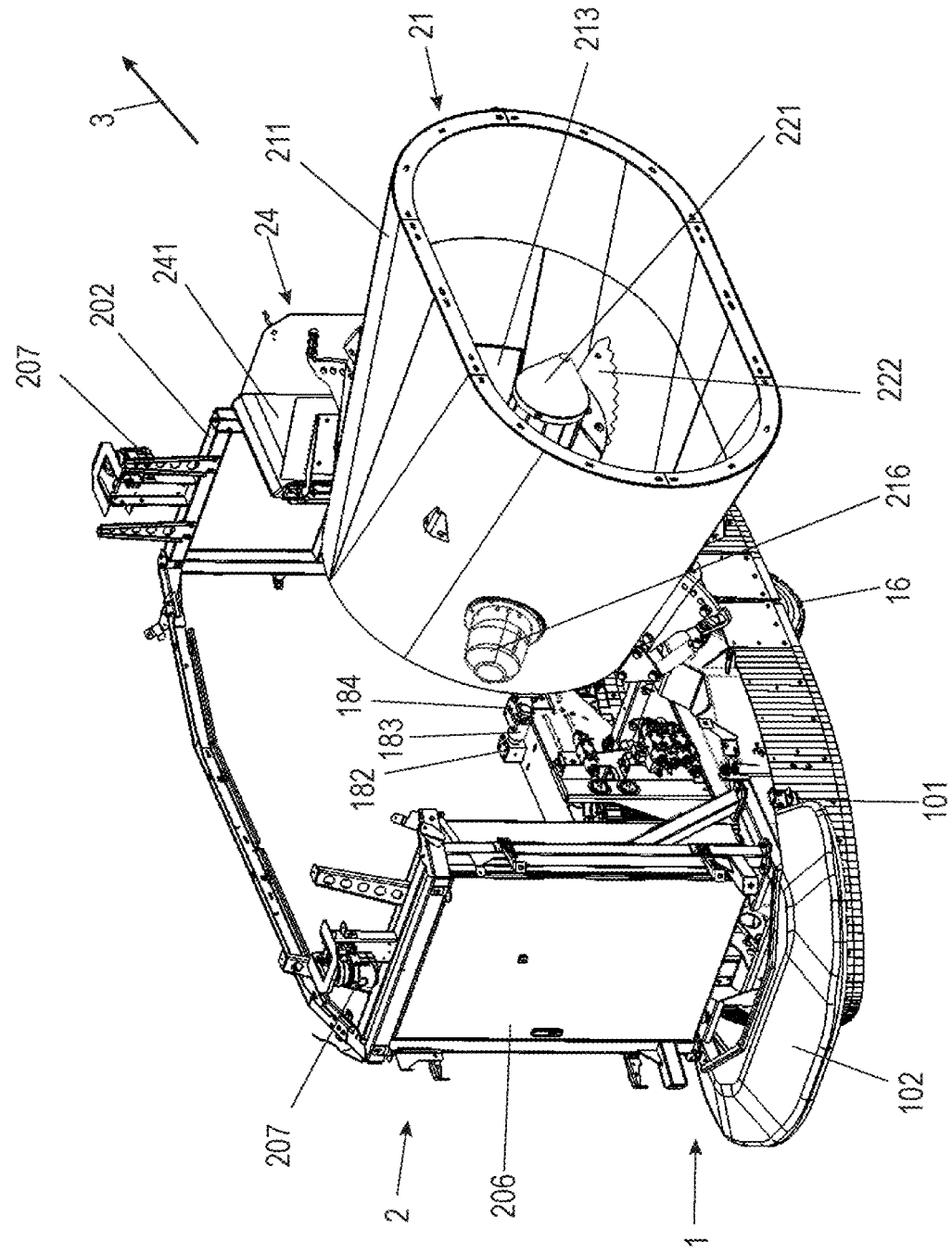
Figure 5C:
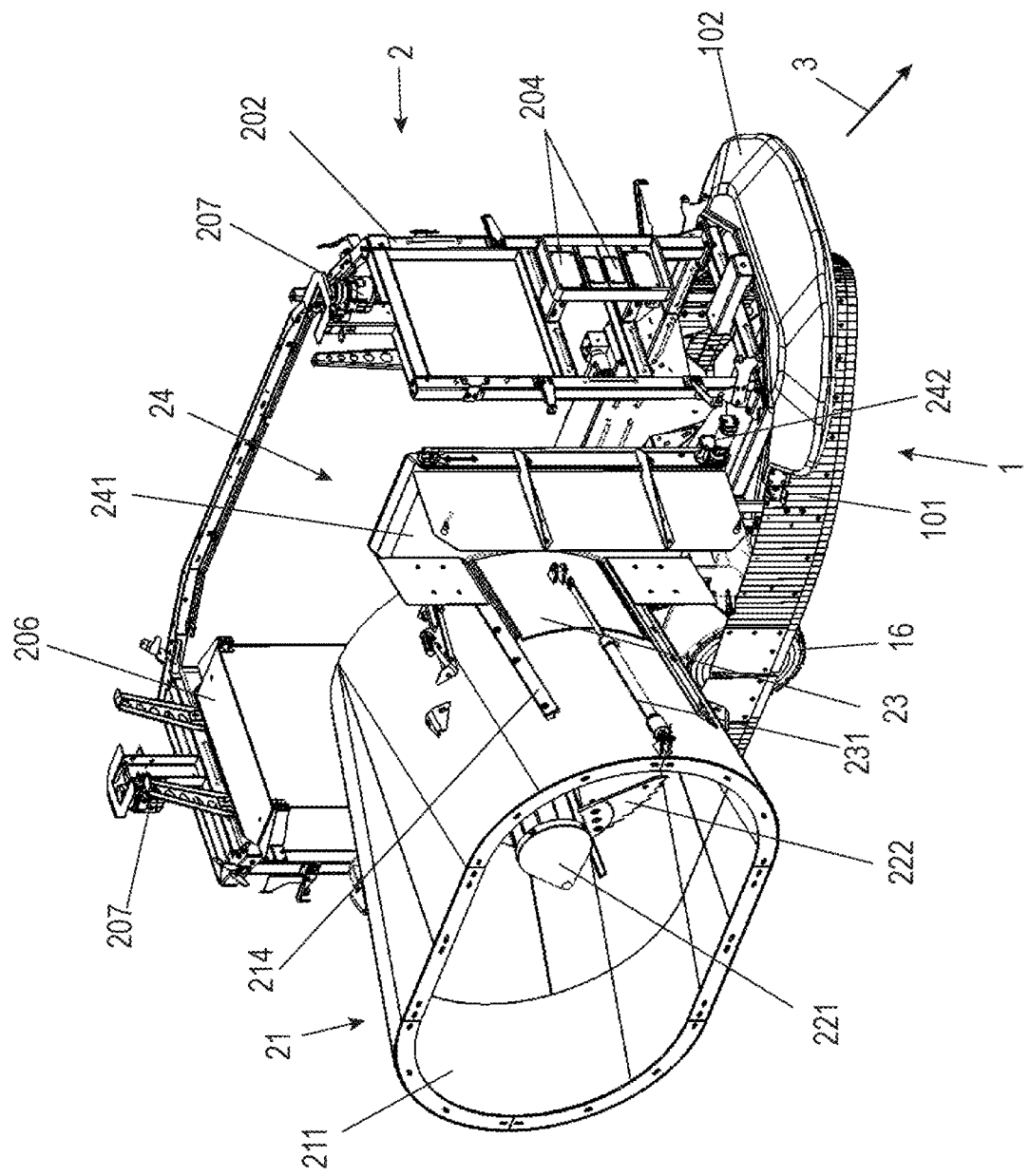
Figure 6:
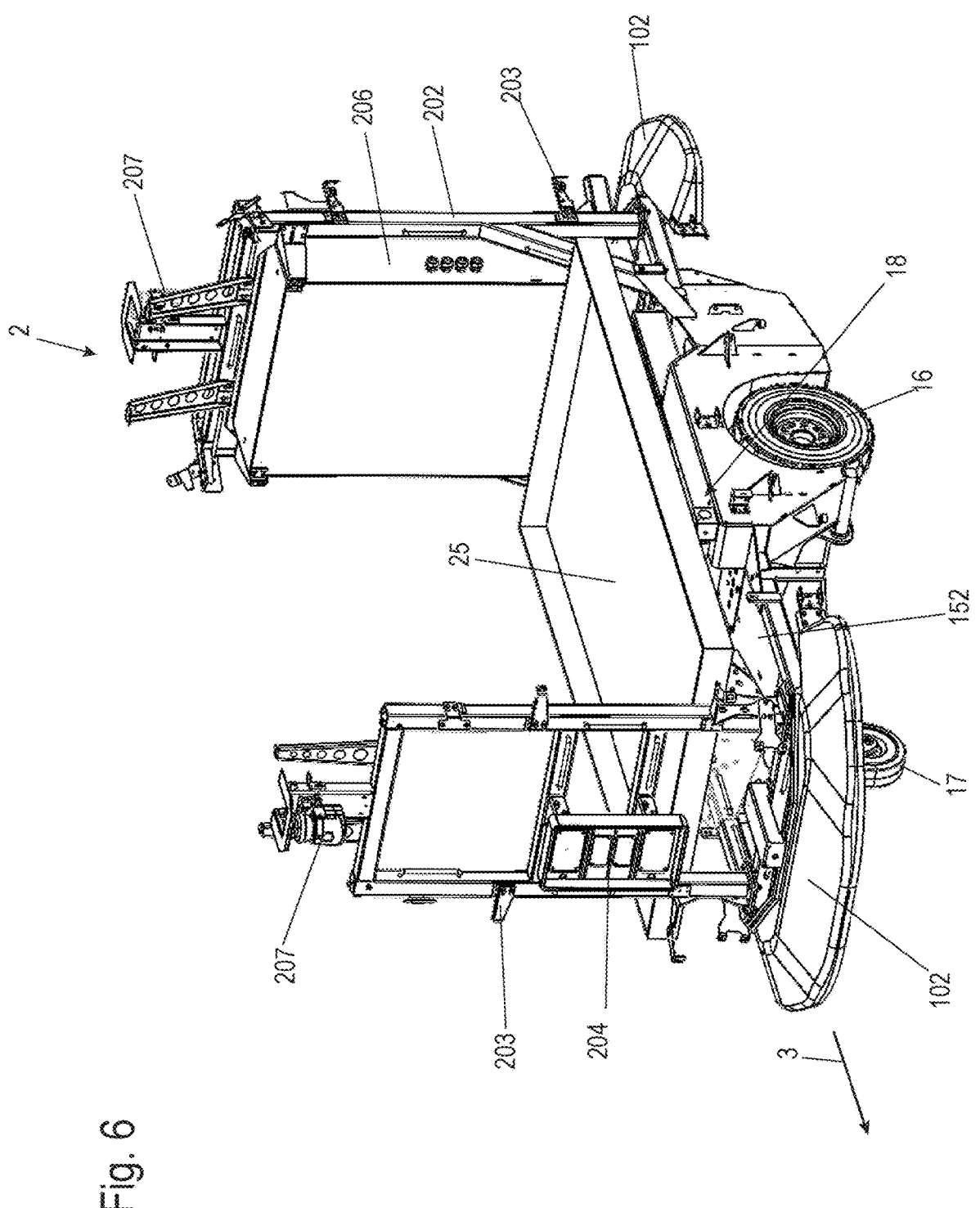

The invention is explained in more detail below with the aid of figures. The figures show:

FIG. 1*a, b* each an oblique view of a first embodiment example of a driving robot from different viewing directions;

FIG. 2*a-f* different views of the driving robot according to FIG. 1*a, b* without cladding;

FIG. 3 an oblique view in the form of an exploded view of a part of a chassis of the driving robot of the previous figures;

FIG. 4 an oblique view of the chassis of the driving robot of the previous figures;

FIG. 5*a-c* an oblique view of the driving robot of the previous figures with tilted functional unit from different viewing directions;

FIG. 6 an oblique view of a second embodiment of a driving robot; and

Figure 7:
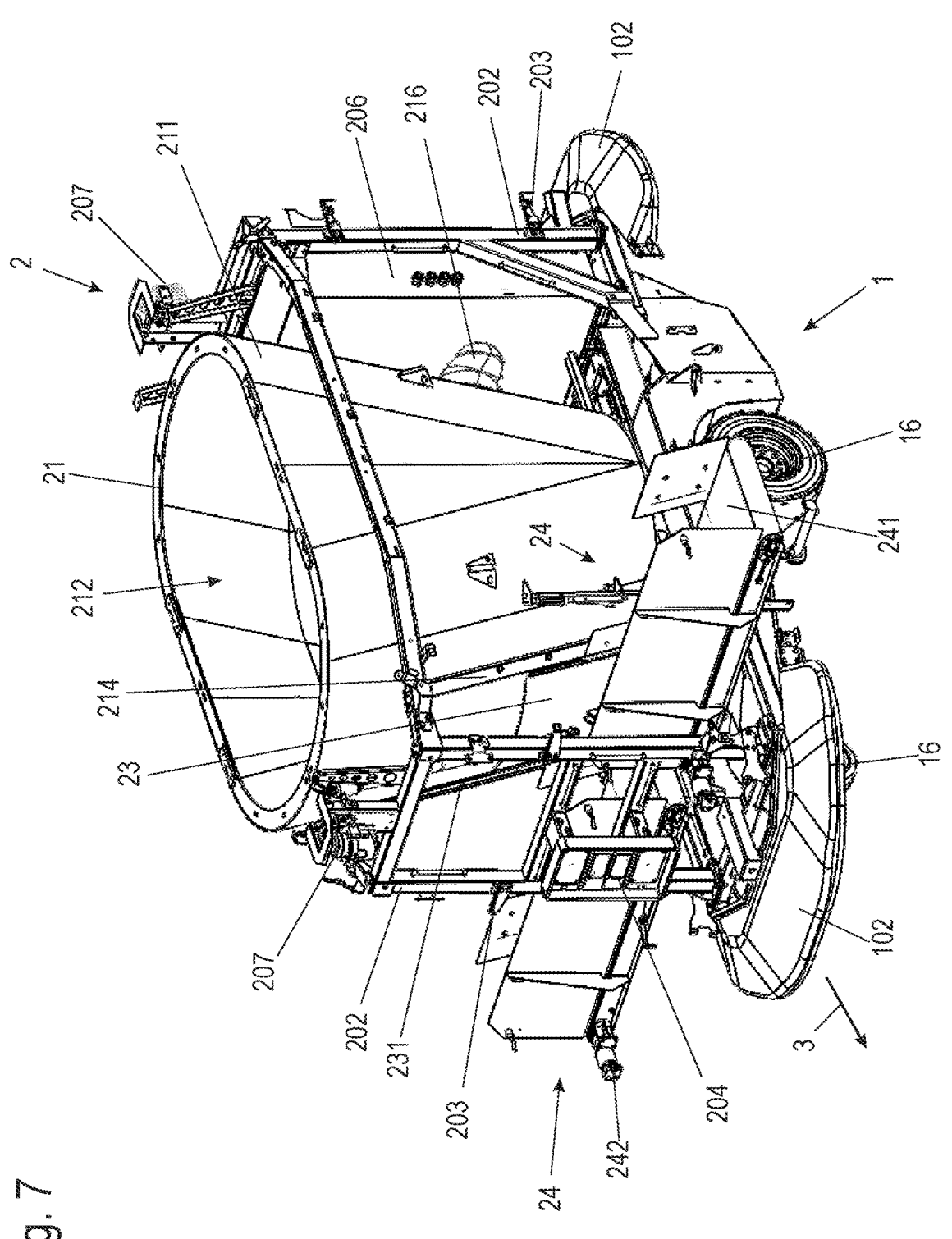

FIG. 7 an oblique view of a third embodiment of a driving robot.

DETAILED DESCRIPTION

Figure 1B:
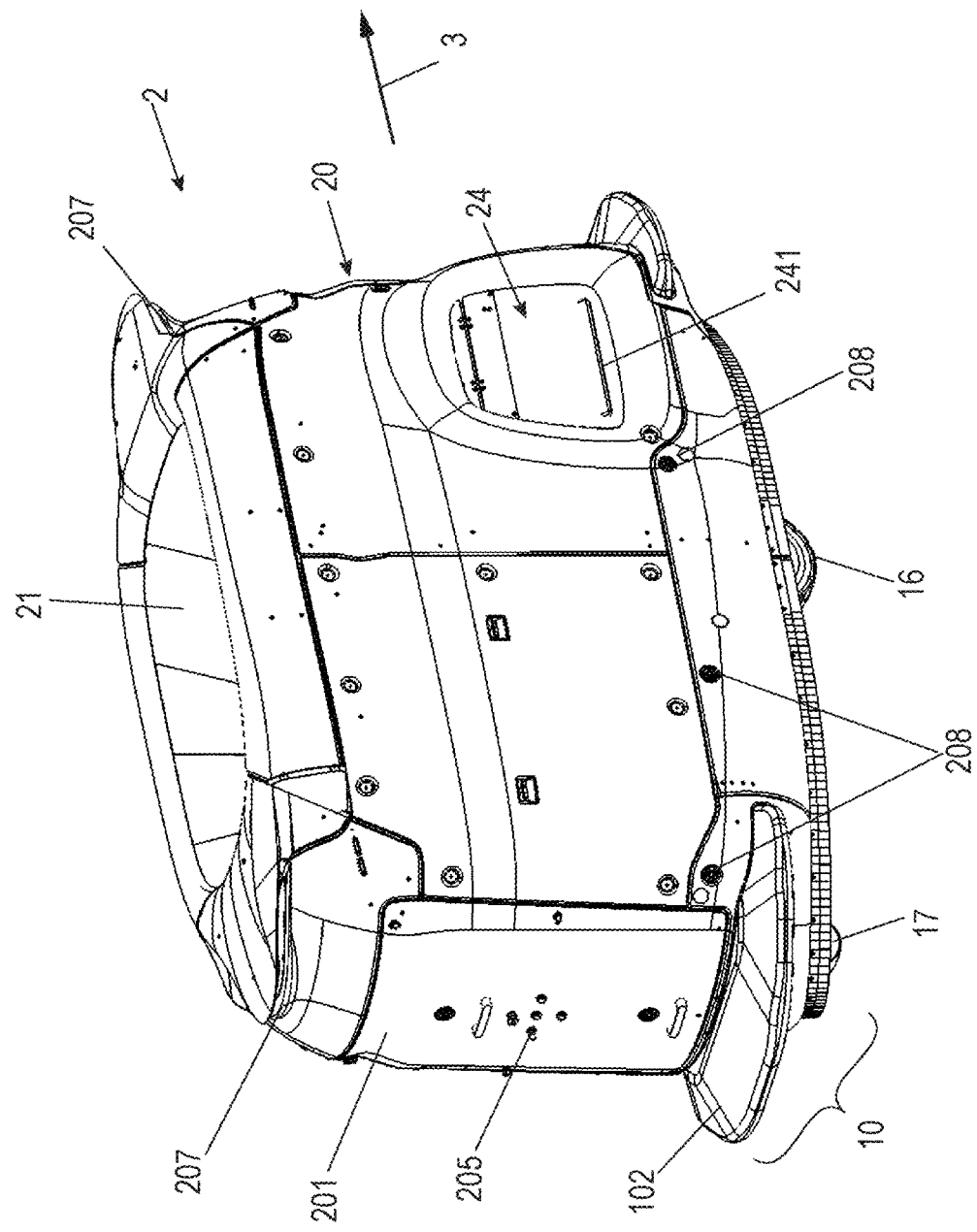

FIGS. 1*a* and 1*b* show an embodiment of a driving robot for agricultural tasks in an overall view from different angles.

The driving robot of this embodiment example is a so-called "feeding robot", which is set up to pick up feed from a dispensing point, mix it automatically, and unload it at one or more feeding points. The driving robot is therefore also referred to below as a "feeding robot" or simply "robot".

Identical reference signs in all figures indicate elements that are identical or have the same effect. For reasons of clarity, not every element in every figure is provided with a reference sign. In the description, the terms "right" and "left" refer to the respective representation of the figure. The terms "top" and "bottom", on the other hand, refer to the natural orientation of the driving robot. The terms "front" and "rear" refer to a forward direction of travel of the driving robot. The forward direction of travel represents the main direction of travel of the driving robot.

The driving robot has two main components, a chassis 1 and a body structure 2. A directional arrow 3 indicates the forward direction of travel in the figures. The chassis 1 can be used universally and, as will be explained in more detail below, can be used together with various functional units. Only cladding and/or protective elements 10, specifically a surrounding skirt 101 and two bumpers 102, as well as one of a total of four wheels, specifically a drive wheel 16, can be seen of the chassis 1 in FIGS. 1*a, b*. In the present embodiment example of a feeding robot, the skirt 101 also functions as a feed pusher, as will be explained in more detail in connection with FIG. 2*f*.

The body structure 2 essentially determines the functionality of the driving robot and thus its intended use within the stable or yard area.

In the case of the driving robot equipped as a feeding robot in the present case, the body structure 2 comprises a mixing container 21 as a key component. The feed to be distributed is taken into the mixing container 21 and can be mixed during filling and during the journey using a mixing device, which is not visible in FIGS. 1*a* and 1*b*. A feed conveyor 24 is provided for discharging the feed, which is implemented using a conveyor belt 241. Depending on the direction of travel of the conveyor belt 241, feed can be discharged to either side of the feeding robot. The arrangement of the mixing container 21 and the feed conveyor 24 represent the functional unit of the driving robot, as they provide the specific functionality of the same and thus define it as a feeding robot.

The body structure 2 comprises a cladding 20, which consists of a plurality of cladding elements, usually cladding plates 201. The cladding plates 201 can preferably be removed separately in order to gain access to underlying components and their maintenance or replacement. Elements accessible from the outside are integrated into the cladding 20, for example loading contacts 204 and operating and/or display elements 205. The driving robot is set up to automatically drive into a charging station, in which the loading contacts 204 are contacted in order to recharge batteries or other power storage devices of the driving robot.

The driving robot is equipped with a navigation system that enables navigation in the barn or yard area, preferably without fixed infrastructure elements such as rails or guide cables. For this purpose, the driving robot is equipped with a number of sensors that are either integrated into the cladding 20 or protrude from the cladding 20.

FIGS. 1*a* and 1*b* show two lidar (light detection and ranging) sensors 207, which are used for object detection to aid navigation. The two lidar sensors 207 are arranged at the front and rear of the driving robot respectively. Alternatively, or additionally, an optical camera can be arranged at the front and possibly also at the rear in the direction of travel. The cameras then serve to provide additional support for navigation if necessary. The cameras can be inclined downwards in order to be able to record and thus monitor the ground area directly in front of the driving robot in the direction of travel (when driving forwards and backwards). Furthermore, ultrasonic sensors 208 are distributed around the circumference of the driving robot in the lower area of the cladding 20.

Further sensors that are not visible here are mechanical sensors that detect the application of force to one or both bumpers 102. For this purpose, the respective bumper 102 can be movably mounted, for example, so that one of possibly several sensors is actuated when moving against a spring force. In an alternative embodiment, the bumper 102 can be formed in an outer area from an elastically deformable material, in particular a foam material, into which a sensor is incorporated, which detects a deformation preferably along the entire edge of the bumper 102. In this way, a collision with an obstacle is advantageously damped and detected at the same time. In one embodiment, for example, two spaced-apart electrodes can be embedded in the elastic material along the edge of the bumper 102, between which a capacitance is detected. A change in capacitance indicates a deformation of the material. In a further embodiment, a tension chain can be incorporated into the elastic material, which is coupled to a switch or sensor. A deformation of the elastic material leads to a pull on the pull chain, which is detected by the switch or sensor.

Figure 2A:
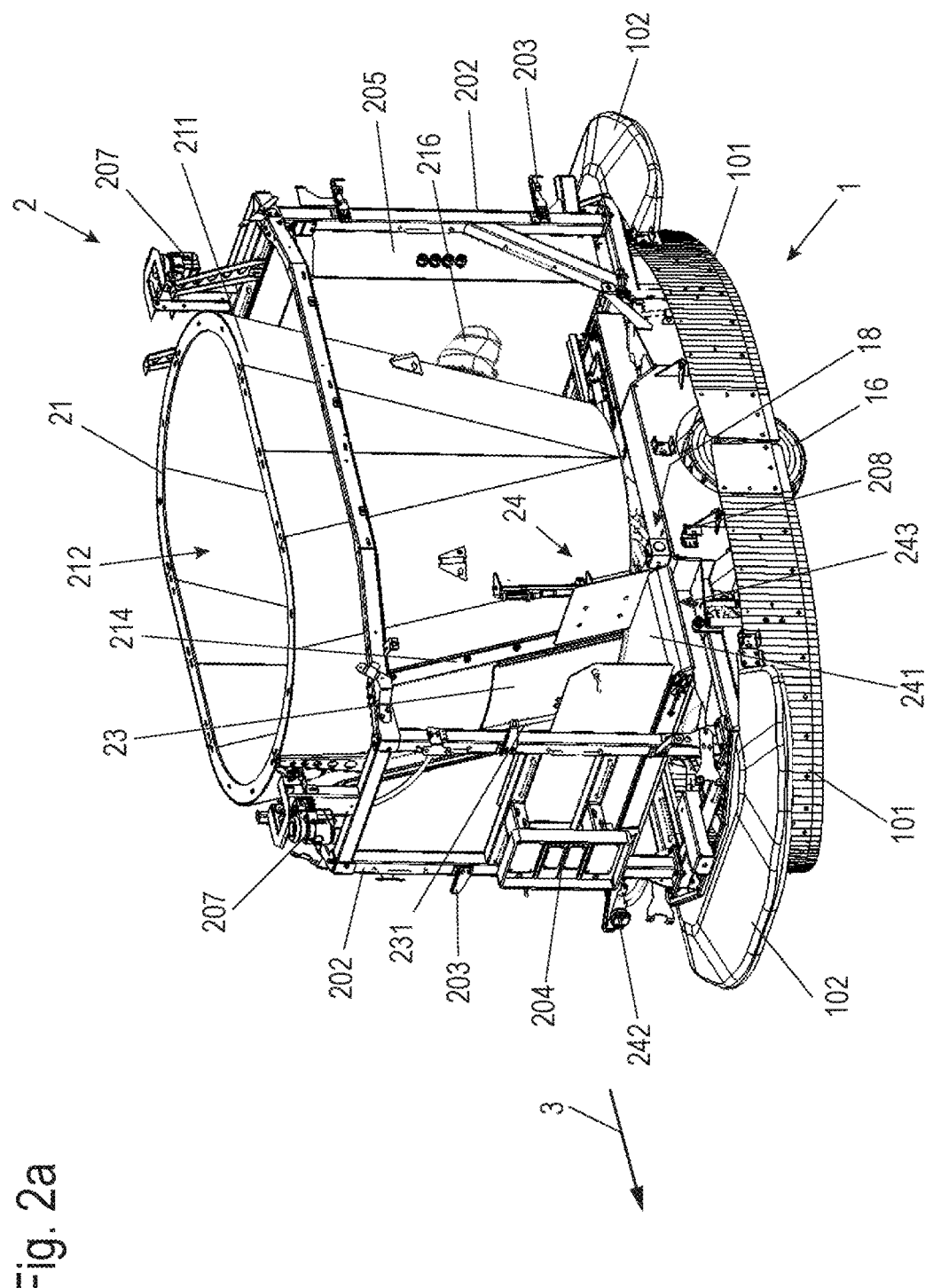
Figure 2B:
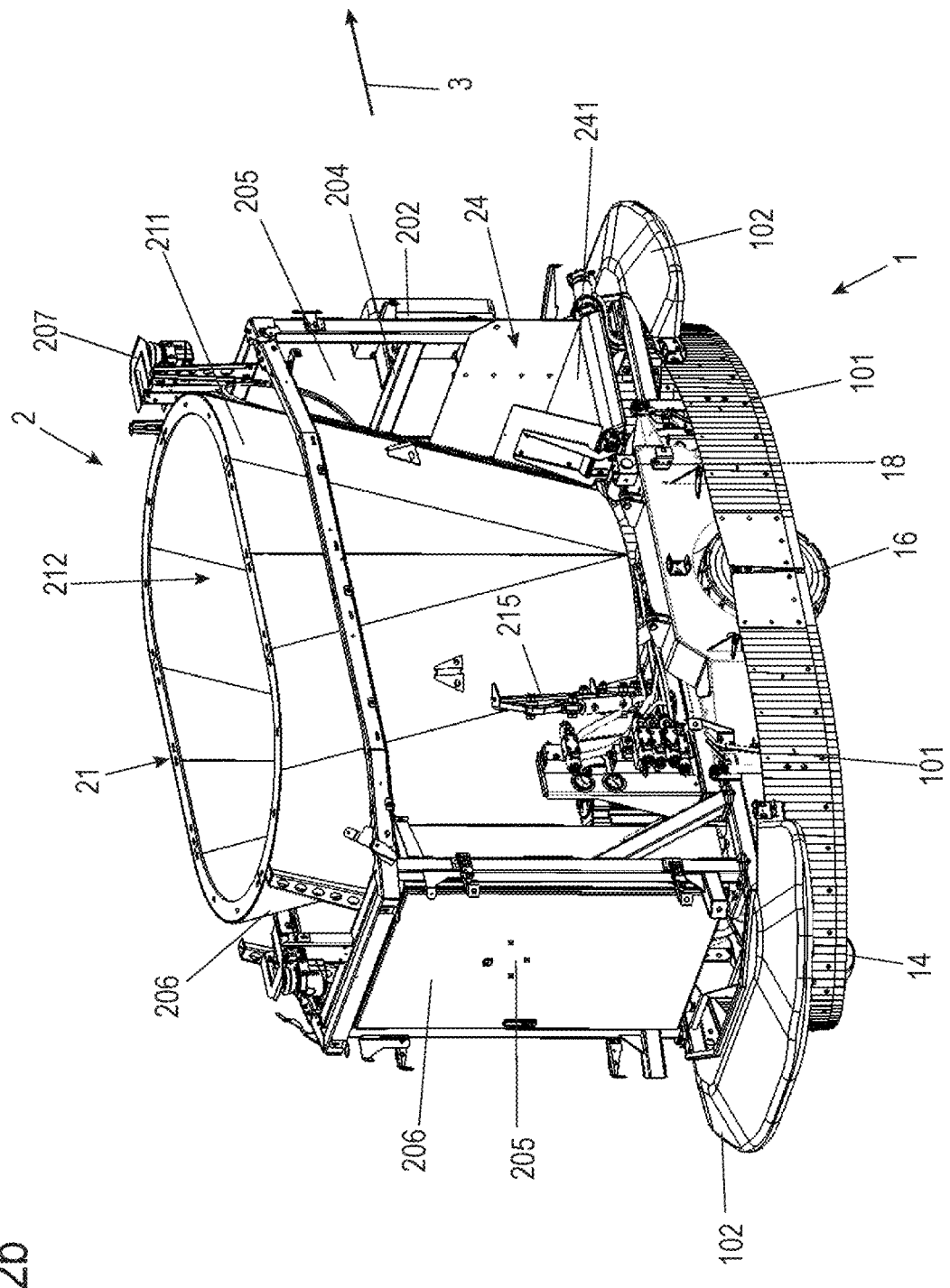

In FIGS. 2a and 2b, the driving robot is shown in the same way as in FIGS. 1a and 1b from identical viewing directions, although the cladding 20 has been removed in order to better illustrate the internal structure of the driving robot.

In addition to the components already recognizable in FIGS. 1a and 1b, it can be seen in these illustrations that the body structure 2 has support frames 202, to which, for example, the cladding plates 201 are attached via booms 203. The loading contacts 204 are also attached to the support frames 202. On the rear side, as seen in the direction of travel, a switch cabinet 206 is mounted on the corresponding support frame 202, which accommodates electrical control devices for actuating drive and working elements and for evaluating the information from the various sensors and on which the operating and/or display elements 205 are also arranged.

The structure of the feed conveyor 24 can be seen in particular in FIG. 2a. As already explained in connection with FIGS. 1a, b, it has the conveyor belt 241, which is aligned transversely to the direction of travel and can be moved in both directions by means of a drive unit 242.

The conveyor belt 241 is arranged below an outlet opening 213 of the mixing container 21, which is located at the front of the mixing container 21 in the forward direction of travel. In addition to the outlet opening 213, a sliding guide 214 is provided on both sides, in which an discharge slide 23 is displaceably arranged. This is connected to a drive unit 231, which is a hydraulic cylinder in the example shown. It should be noted that in alternative embodiments of the driving robot, a different drive, for example an electric motor drive, can also be used to move the discharge slide 23. By means of the drive unit 231, the discharge slide can be moved downwards so that it covers the outlet opening 213 or can be raised to expose the outlet opening 213. The feed in the mixing container 21 can then pass through the outlet opening 213 onto the conveyor belt 241 and be discharged to one of the two sides. There are thus two discharge areas 243 available for feed to be distributed. In the example shown, the drive unit 242 for the conveyor belt 241 is also hydraulically actuated, i.e., formed by a hydraulic motor. In alternative embodiments of the feeding robot, a different type of drive, for example an electric motor drive, can also be used at this point.

The illustrations in FIGS. 2a and 2b also show that the mixing container has the shape of an upwardly open truncated cone with a round cross-section in the lower area, which widens upwards to an oval cross-section in the upper area. The mixing container 21 is open at the top, so that a large filling opening 212 is provided. As the comparison with FIGS. 1a and 1b shows, this filling opening 212 is also recessed in the cladding 20 over essentially its entire size.

Figure 2C:
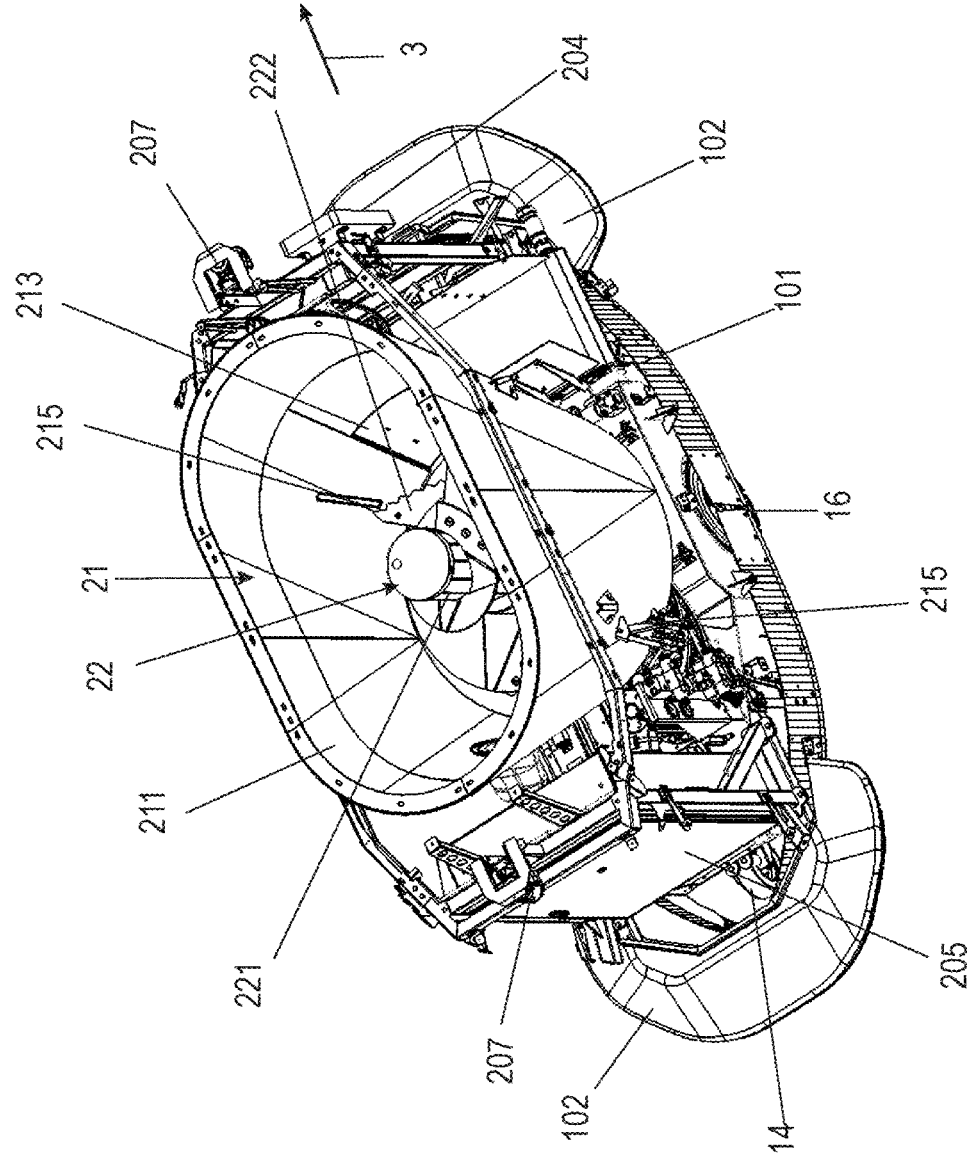
Figure 2D:
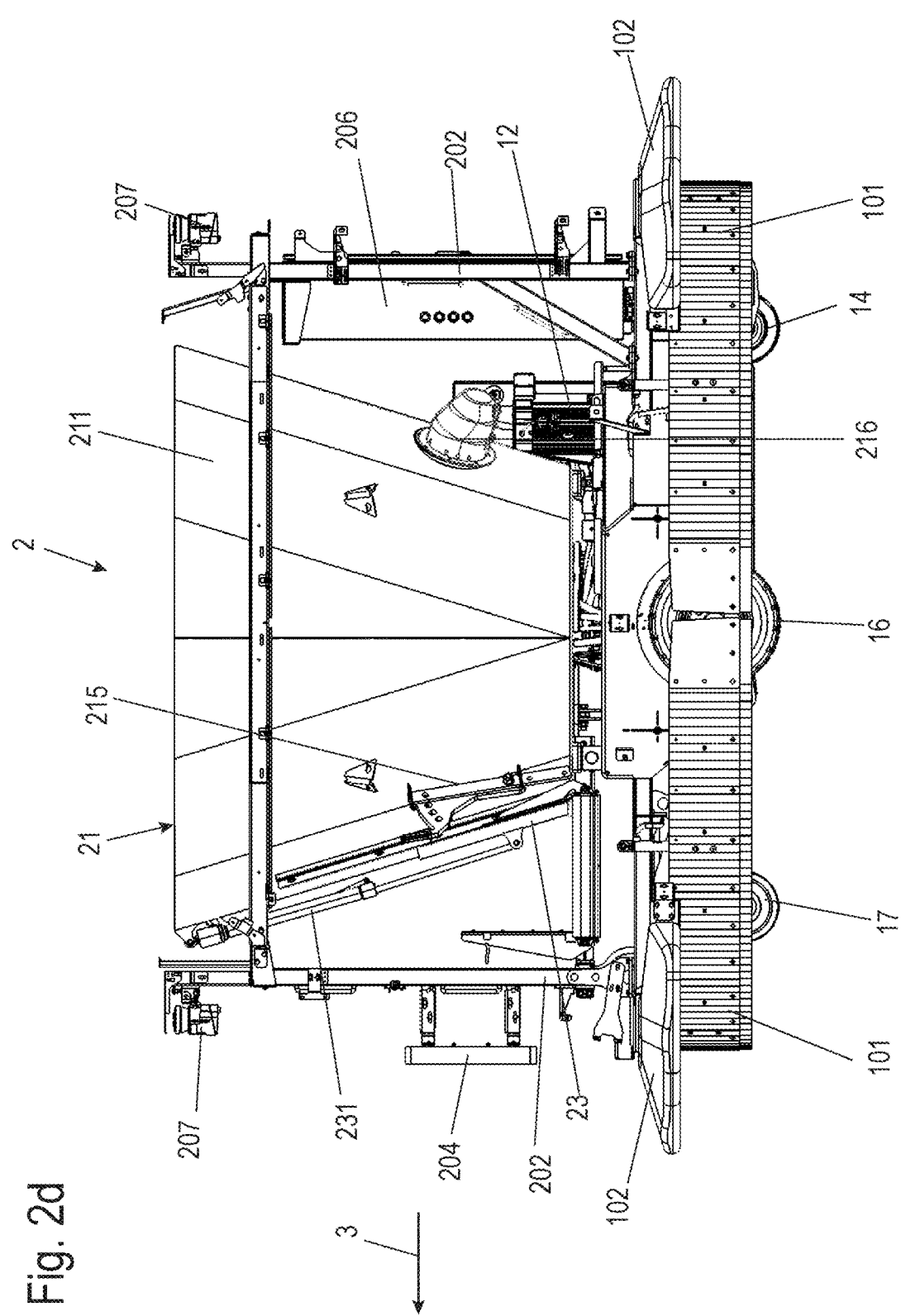
Figure 2E:
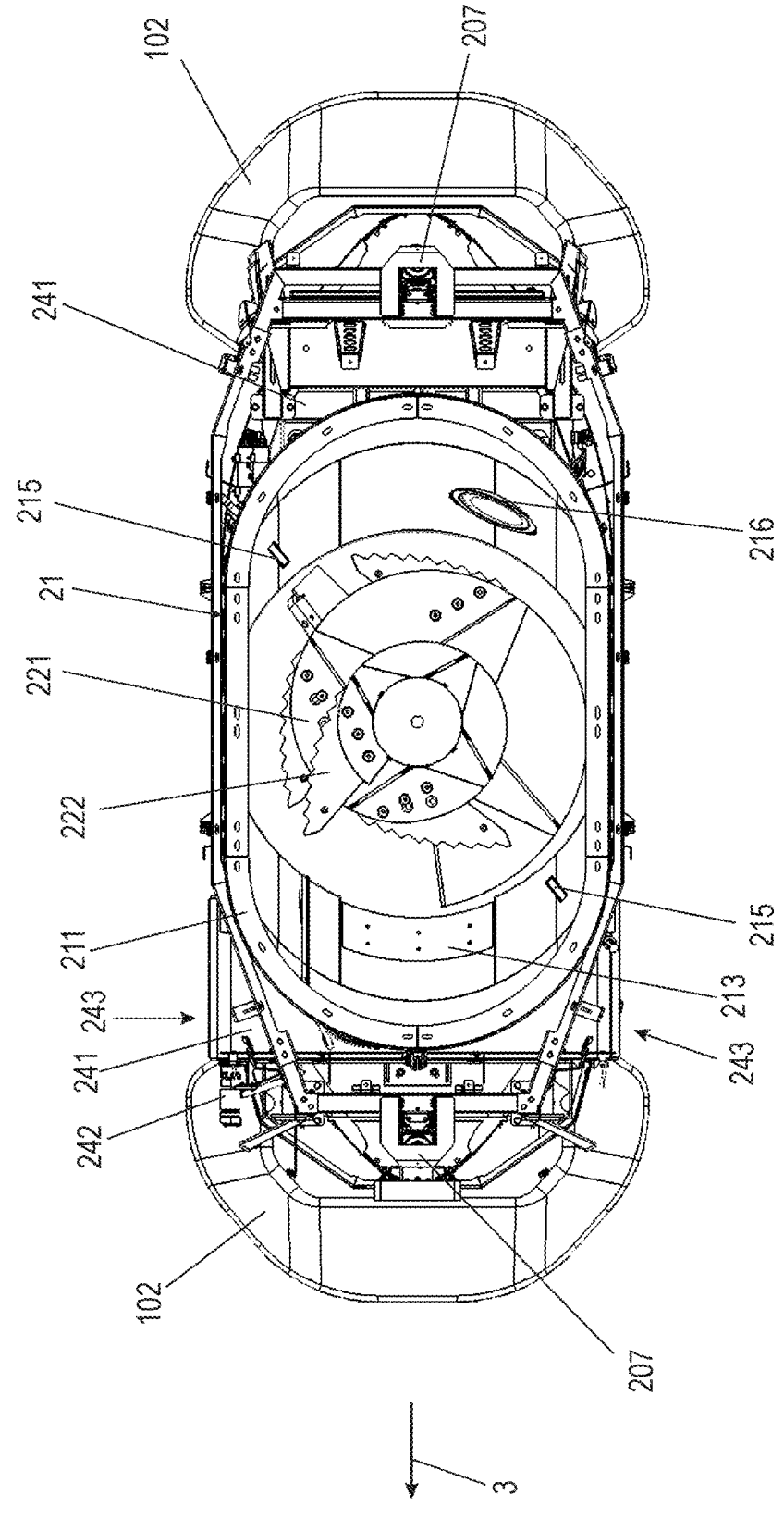
Figure 2F:
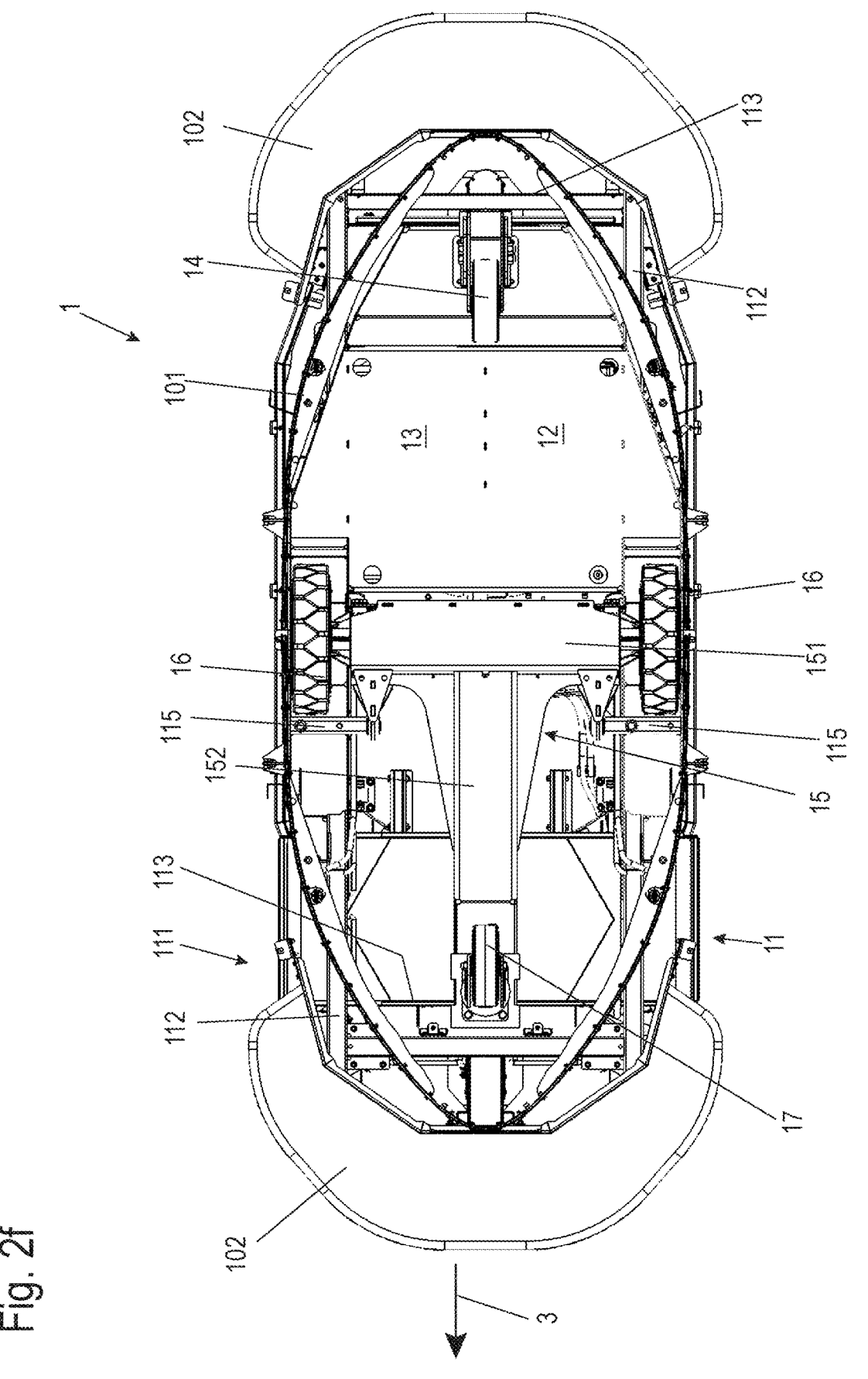

FIGS. 2c and 2d show the feeding robot in an oblique top view and in a side view, respectively. FIGS. 2e and 2f show the feeding robot from above and below.

The view from above in FIG. 2e essentially shows the view into the mixing container 21. A mixing auger 221 is arranged centrally at the bottom of the mixing container 21 as part of a mixing device 22. This can be set in rotation by a drive element that is not visible here, as a result of which the feed taken in is mixed on the one hand and crushed on the other. In order to achieve comminution, the mixing auger 221 has replaceable knives 222 on the outside in order to be able to comminute the feed better. Alternatively, the edges of the mixing auger 221 can be sharpened at least in sections so that they act like cutting blades. Further alternatively or additionally, separate, radially outwardly pointing knives can be arranged below and/or above the mixing auger 221. The mixing or chopping process of the feed in the mixing container 21 can be monitored or controlled by the feed sensor 216. The feed sensor 216 can, for example, be an optically operating homogeneity sensor.

In the illustrated embodiment example, a mixing auger 221 is provided in the mixing container 21. In alternative embodiments of the feeding robot, several mixing augers, possibly of the same size or of different sizes, can be provided, preferably one behind the other in the direction of travel. The drive unit can be an electric motor or a hydraulic motor, for example.

The view from below in FIG. 2f shows all four wheels of the chassis 1, the two drive wheels 16 arranged along an axis, a swivel wheel 14 and a further swivel wheel 17. The swivel wheel 14 and the further swivel wheel 17 are passive wheels that move with the moving robot and also passively perform a swivel movement around a vertical axis. The driving robot is driven and also controlled exclusively by the drive wheels 16, whereby a separately controllable drive motor is assigned to each drive wheel 16, whereby the driving robot can be steered.

FIG. 2f also shows that the skirt 101 surrounds the chassis 1 in the lower area close to the ground in the shape of an ellipse. This shape makes it possible to use the feeding robot to push aside feed that has already been delivered along a feed alley, for example, as it passes by. As a result, the feeding robot can also take on the function of a so-called "feed pusher", with which feed can be pushed closer to a feed fence, for example. For this purpose, the skirt 101 is preferably designed in two parts and has a front and a rear section. The two sections can then be raised independently of each other or lowered close to the floor. To push the chuck together, the section at the front in the current direction of travel is lowered and the section at the rear in the direction of travel is raised. In normal driving mode, both sections are raised, as shown in FIGS. 1 *a, b*, for example.

The exact structure of the chassis 1 and also the way in which the various wheels, drive wheels 16 and the swivel wheels 14 and 17 can move in relation to each other in order to compensate for uneven ground is explained below in connection with FIGS. 3 and 4.

For this purpose, FIG. 3 shows the chassis 1 without the body structure 2 and also without the skirt 101 and the bumpers 102 in the form of an exploded view looking diagonally downwards.

It can be seen from this illustration that the chassis 1 comprises a semi-trailer chassis 11 that rests on a towing chassis 15. The semi-trailer chassis 11 extends with a support frame 111 by means of longitudinal beams 112 essentially over the entire length of the driving robot. At the front and rear ends, bumper brackets 114 are arranged on the longitudinal beams 112, which support the bumpers 102. In addition to the body, which is supported by the semi-trailer chassis 11, this also has installation space for a hydraulic unit 12 and batteries 13. These are arranged in a box-shaped structure below or between the longitudinal beams 112.

The semi-trailer chassis 11 includes the swivel wheel 14 as the only one of the four wheels present.

The other three wheels, the drive wheels 16 and the further swivel wheel 17 are mounted in a triangular arrangement on the towing chassis 15. For this purpose, the towing chassis 15 comprises a support structure 151, which in principle forms the axle on which the drive wheels 16 are arranged. These are individually driven by drive motors concealed in the support structure 151, which are not visible here.

A boom 152 projects forward from the center of the support structure 151, with the further swivel wheel 17 mounted at its front end.

The three wheels, the two drive wheels 16 and the further swivel wheel 17, represent three points of contact between the towing chassis 15 and the ground. Since a plane is geometrically determined by three points, but not overdetermined, it is ensured that the three wheels, i.e., the two drive wheels 16 and the further swivel wheel 17, are in contact with the ground at all times. This ensures a secure drive and good support even on an uneven surface.

The semi-trailer chassis 11 is supported at two points on the towing chassis 15. For this purpose, the towing chassis 15 has two bearing eyes 153, which are positioned between the drive wheels and the further swivel wheel 17 on extensions mounted on the support structure 151, viewed in the longitudinal direction. The two bearing eyes 153 lie on an axis that runs parallel to the axis of the drive wheels 16. Bearing bolts 115, which are mounted on the semi-trailer chassis 11, engage in the bearing eyes 153. Accordingly, the towing chassis 15 can oscillate about the axle on the semi-trailer chassis 11 that runs through the bearing eyes 153. In this way, any unevenness of the ground in the longitudinal direction can be compensated for in the best possible way by the combination of semi-trailer chassis 11 and towing chassis 15, whereby safe ground contact of all wheels is guaranteed.

FIG. 4 shows the chassis 1, comprising the semi-trailer chassis 11 and the towing chassis 15, in the assembled state of these two main components. In addition, the skirt 101 used as a feed pusher is shown mounted. In FIG. 4, the mounting spaces provided in the chassis 1 for the hydraulic unit 12 and batteries 13 can be seen.

FIG. 4 also shows supports 18, which are used for the coupling between the chassis 1 and the functional unit of the body structure 2 in accordance with the application. Each of the three supports 18 in the present case comprises a force sensor 183. These force sensors 183 are mounted on the side of the chassis 1 in bearing blocks 182 and each provide a bearing plate 184 towards the functional unit. It is intended that relevant components of the body structure 2 are mounted on these bearing plates 184—in this case the mixing container 21 and the feed conveyor 24, which together form the functional unit of the driving robot 24.

In the driving robot shown in FIGS. 1a and 1b and 2a-2f, which is designed as a feeding robot, for example, the entire mixing container 21 including the mixing device 22 as well as the discharge slide 23 and the feed conveyor 24 is mounted as a compact module on the bearing plates 184.

The force sensors 183 can be used to statically measure the weight force acting on the chassis from the functional unit. If the empty weight of the body structure 2 is known, the mass of feed in the mixing container 21 can be determined at any time, for example. Changes in the measured values provide information about the quantities of feed picked up and/or dispensed.

To fill the mixing container 21, for example, it can be provided that the driving robot positions itself under a silo or a bunker or a comparable dispensing point for feed components and reports this to a higher-level control system, e.g., a farm management system, in particular via a wireless network connection. The feed dispensing point is then instructed by the control system to dispense the feed component, which is filled into the mixing container 21 accordingly. Meanwhile, the force sensors 183 detect an increase in weight of the functional unit, which can be assigned to the corresponding feed component and which is transmitted to the control system.

If the amount filled approaches the intended amount, the control system can reduce the filling rate in order to then stop the filling as correctly as possible when the intended amount is reached. If the recorded weight does not change or changes too slowly during filling, an error can be output, e.g., that the dispensing point is empty or its outlet is blocked. Once all the required components have been filled into the mixing container 21 at one or more dispensing points, the feeding robot can start distributing the feed. The mixing device 22 is preferably operated during filling and during the journey to the feed dispensing points in order to mix and, if necessary, grind the feed.

To discharge the feed, the discharge slide 23 is opened while the mixing auger 221 is rotating and the conveyor belt 241 is operated. The total amount of feed dispensed and the amount dispensed per time unit is recorded via the force sensors 183. As a rule, feed is discharged in a strip in front of feed grids, whereby a feed quantity per unit length is specified. The amount of feed dispensed per unit of time and the travel speed of the feeding robot are then coordinated in order to dispense the desired amount of feed. The amount of feed dispensed per unit of time can be varied by the position of the discharge slide 23 and/or the speed of the mixing auger 221 depending on the measured values of the force sensors 183. This also takes into account the fill level of the mixing container 21. When the mixing container 21 is almost empty, for example, a higher speed of the mixing auger 221 is required in order to empty the container as completely as possible.

When dispensing the feed, the measured values can also be used to detect system faults, for example non-functional drives of the mixing auger 22, the conveyor belt 241 and/or the discharge slide 23. Before refilling the mixing container 21, the force sensors 183 can be used to check the remaining amount of feed and a warning can be issued to a user if the remaining amount of feed is too large, so that a possibly undesired mixing of different feed rations would occur.

Furthermore, the force sensors 183 can be used to determine dynamically changing forces or force ratios during operation. These can provide information, for example, about inclinations of the driving robot in the longitudinal and also in the transverse direction and also about unevenness of the ground. Furthermore, accelerations can be recorded, which can be used to support the navigation of the driving robot with odometric data.

As explained above, the weight of the functional unit rests on the bearing plates 184 during operation. A fixed connection can be provided in that it is made using only manually releasable screws or similar connecting means. Alternatively, however, it may also be possible for actuators to automatically fasten the functional unit to the bearing plates 184, for example by detachable latching. In such an embodiment, the functional unit can also be automatically lifted off the chassis 1 in an exchange station and exchanged for another functional unit, in particular one serving a different function. In this context, the force sensors 183 can be used to monitor and/or control the coupling process.

In addition to the supports 18, the embodiment example shown here also includes swivel bearings 181, which can also be seen in FIG. 4.

For service purposes, it may be provided that the functional unit is not completely removed, but is tilted to the side in order to gain access to otherwise concealed components of the functional unit and/or other parts of the body structure 2 and/or the chassis 1.

The swivel bearings 181, which allow the mixing container 21 and any components permanently connected to it, such as the mixing device 22, the discharge slide 23 and/or the feed conveyor 24, to be tilted, serve this purpose. A connection between the mixing container 21 and the swivel bearings 181 can be designed in such a way that the swivel bearings 181 only come into engagement with the mixing container after the connection to the bearing plates 184 has been released, so that no forces are transmitted via the swivel bearings 181 during normal operation. To facilitate the tilting process, an actuator, e.g., a hydraulic cylinder, may be provided. In addition, lateral supports may be provided, in particular extendable supports, in order to prevent the driving robot from tipping over even when the mixing container 21 is tilted. However, it is also possible for the tilted mixing container 21 to be placed with its edge on an external base.

FIGS. 5a to 5c show the driving robot of FIGS. 1a, 1b and 2a-2f in such a service state, in which the functional unit, i.e., the mixing container 21 together with the feed conveyor 24, is tilted to the side on the swivel bearings 181, in each case in an oblique view from different angles.

Due to the modular structure with the chassis 1 on the one hand and the body structure 2 with the functional unit on the other hand, the chassis 1 can be used flexibly and thus the driving robot can be used for more than one task within an agricultural operation.

In addition to the exemplary use of the driving robot as a feeding robot shown here, it is conceivable, for example, to use it as a cleaning robot, as a robot for removing manure from stable areas, as a bedding robot or generally as a transport robot within the farm.

FIG. 6 shows an embodiment of a driving robot as a universally usable transport robot. The chassis 1 and a large part of the body structure 2 correspond to those of the first embodiment example.

Instead of the mixing container 21 and the feed conveyor 24, which form the functional unit of the first embodiment example, a transport floor 25 is provided here as a functional unit. The transport floor 25 rests on the supports 18, so that forces on the chassis can in turn be recorded via the force sensors 183 not visible in FIG. 6. In the design shown here, there is no skirt on the chassis 1. Optionally, however, a skirt that can be used as a feed pusher (see skirt 101 in the figures described above) can also be present when the driving robot is designed as a transport robot.

FIG. 7 shows a driving robot with the same chassis 1 for another application. The functional unit included in this example allows the driving robot to be used as a litter robot. The functional unit is similar to that of the first embodiment example in that it also has a container 21 and a feed conveyor 24 with conveyor belt 241. The container 21 holds bedding material that can be automatically scattered into animal holding areas, e.g., animal boxes, via the conveyor belt 241. In order to be able to convey the bedding material better into the animal housing areas, the conveyor belt protrudes laterally further beyond the chassis 1 than in the feeding robot of the first embodiment example. Here, too, there is no apron on the chassis that can be used as a feed pusher. This could, of course, also be present in order to use the litter robot additionally for pushing together feed that has already been spread or also if the driving robot is also to be used as a feeding robot by changing the functional unit.

In addition to the driving robot as a "mobile" platform, it is also possible to continue using a functional unit that is not currently required on a stationary frame as a stationary functional unit, e.g. as a stationary feed mixer. In this case, the functional unit can be automatically transferred from the chassis 1 to the frame or removed from it.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 Chassis
10 Cladding and protective elements
101 Skirt (feed pusher)
102 Bumper
11 Semi-trailer chassis
111 Support frame
112 Longitudinal beam
113 Cross beam
114 Bumper bracket
115 Bearing bolt
12 Hydraulic unit
13 Batteries
14 Swivel wheel
15 Towing chassis
151 Support structure
152 Boom
153 Bearing eye
16 Drive wheel
17 Further swivel wheel
18 Support
181 Swivel bearing
182 Bearing block

183 Force sensor
184 Bearing plate
2 Body structure
20 Cladding
201 Cladding plates
202 Support frame
203 Boom
204 Loading contacts
205 Operating and/or display elements
206 Switch cabinet
207 Lidar sensor
208 Ultrasonic sensor
21 (Mixing) container
211 Wall
212 Filling opening
213 Outlet opening
214 Sliding guide
215 Sword
216 Feed sensor
22 Mixing device
221 Mixing auger
222 Knife
223 Drive unit for mixing auger
23 Discharge slide
231 Drive unit for discharge slide
24 (Feed) conveyor
241 Conveyor belt
242 Drive unit for conveyor belt
243 Discharge area
25 Transport floor
3 Direction arrow indicating forward direction of travel

The invention claimed is:

1. A driving robot for agricultural tasks, the driving robot comprising:
   a chassis;
   a functional unit interchangeably mounted on the chassis, wherein the chassis includes supports carrying the functional unit; and
   at least one pivot bearing on the chassis and arranged relative to the functional unit so that the at least one pivot bearing only comes into engagement with the functional unit after a connection between the function unit and the supports has been released,
   wherein a force sensor is provided for at least one of the supports, and wherein the force sensor is configured to detect a force exerted on the chassis by the functional unit.

2. The driving robot of claim 1, wherein the supports include at least three supports, each of which is assigned a corresponding force sensor.

3. The driving robot of claim 1, wherein the force exerted by the functional unit on the chassis passes completely via the supports.

4. The driving robot of claim 1, wherein the supports comprise bearing plates.

5. The driving robot of claim 1, wherein the connection between the supports and the functional unit are closeable or releasable in an actuated manner via actuators.

6. The driving robot according to claim 1, further comprising:
   a drive configured to tilt the functional unit on the chassis.

7. The driving robot of claim 1, wherein the chassis comprises a semi-trailer chassis and a towing chassis, wherein the semi-trailer chassis rests in a pivot bearing on the towing chassis.

8. The driving robot of claim 7, wherein the semi-trailer chassis has a swivel wheel.

9. The driving robot of claim 8, wherein the towing chassis has at least two drive wheels and a further swivel wheel.

10. The driving robot of claim 1, wherein the driving robot is a feeding robot and the functional unit has at least one container for holding feed.

11. The driving robot of claim 10, wherein the container is a mixing container having a mixing device.

12. The driving robot of claim 11, wherein the container is coupled to a feed conveyor to discharge feed from the container.

13. The driving robot of claim 12, wherein the feed conveyor comprises a conveyor belt.

14. The driving robot of claim 1, wherein the driving robot is a cleaning robot, a bedding robot, or a universal transport robot.

15. The driving robot of claim 1, wherein
   at least one battery and a hydraulic unit are mounted on the chassis,
   the at least one battery and the hydraulic unit are covered by the functional unit when the functional unit is connected to the supports, and
   the at least one battery and the hydraulic unit are exposed when the functional unit is engaged with the at least one pivot bearing.

16. The driving robot of claim 1, wherein
   the driving robot has two lateral sides transverse to a direction of travel of the driving robot,
   the at least one pivot bearing comprises at least two pivot bearings mounted on a same one of the two lateral sides of the driving robot.

17. The driving robot of claim 1, wherein the at least one pivot bearing is arranged relative to the functional unit so that forces are not transmitted via the at least one pivot bearing when the functional unit is connected to the supports.

* * * * *